United States Patent [19]

Takahashi

[11] Patent Number: 5,737,321
[45] Date of Patent: Apr. 7, 1998

[54] MULTI-MEDIA TELECONFERENCE SYSTEM

[75] Inventor: Eiichiro Takahashi, Kawasaki, Japan

[73] Assignee: Fujitsu Limited, Kanagawa, Japan

[21] Appl. No.: 547,665

[22] Filed: Oct. 18, 1995

[30] Foreign Application Priority Data

Mar. 16, 1995 [JP] Japan ................................ 7-057423

[51] Int. Cl.⁶ .................................................... H04L 12/18
[52] U.S. Cl. ........................ 370/263; 348/15; 370/399; 379/202
[58] Field of Search ............................ 379/202, 203; 348/14, 15, 16; 370/260, 263, 264, 357, 392, 399

[56] References Cited

U.S. PATENT DOCUMENTS

| | | | |
|---|---|---|---|
| 4,796,293 | 1/1989 | Blinken et al. | 379/202 |
| 5,512,938 | 4/1996 | Ohno | 348/15 |
| 5,548,591 | 8/1996 | Horikoshi | 370/260 |

FOREIGN PATENT DOCUMENTS 537669  2/1993  Japan.

*Primary Examiner*—Benedict V. Safourek
*Attorney, Agent, or Firm*—Helfgott & Karas, PC.

[57] ABSTRACT

A multimedia teleconference system serving sound data to an existing telephone terminal as well as multimedia terminals, and makes the existing telephone terminal join in a multimedia telephone conference by the use of sound data. The multimedia teleconference system includes a first multimedia terminal for generating various kinds of media data including at least, sound data. The teleconference system further including a plurality of second multimedia terminals for setting connections corresponding to each of the various kinds of media data, a telephone terminal for receiving only sound data, and a switch for receiving the various kinds of media-data sent from the first multimedia terminal and distinguishing a connection for the sound data and extracting only the sound data transferring on the distinguished connection to send the extracted sound data to the telephone terminal.

15 Claims, 9 Drawing Sheets

[MSETUP message / MCONNECT message]

MULTI-MEDIA TELECONFERENCE SYSTEM

BACKGROUND OF THE INVENTION

1. Field of the Invention

The present invention relates to a multi-media teleconference system, and more particularly to a multi-media teleconference system, which serves sound data to existing telephone terminals as well as multi-media terminals, and makes the existing telephone terminal join in a multi-media teleconference by the use of the sound data.

1. Description of the Related Art

In recent years, communication terminals have been developed to deal with a plurality of media, such as sound, graphic and video image data. A multi-media teleconference system, in which these terminals are connected to a switch to execute a teleconference, has been developed.

In regard now to FIG. 11, a broadcasting data communication system, in which same data are sent to a plurality of multi-connected multi-media terminals, which is shown as a conventional system. In FIG. 11, the reference numeral 11 is a switch, to which a plurality of multi-media terminals 30 and 21 to 24 are connected. Data sent from the multi-media terminal 30 is cross-connected to the multi-media terminals 21 to 24 by the switch 11.

A multi-media conference (teleconference) system, such that the same data are simultaneously broadcasted from the multi-media terminal 30 to the multi-media terminals 21 to 24, is now considered. The multi-media terminal 30 is connected to a broadcasting communication, or multi-casting point 1 in the switch 11.

The multi-media terminals 21 to 24 are connected to points 2 to 5 in the switch 11, respectively. Multi-media data sent from the multi-media terminal 30 can be multiplexed and received by the switch 11 according to a cross-connecting method employed in the switch 11.

The switch 11 cross-connects and sends multi-media data, such as sound, graphic or video image data, to the broadcasted addresses of the plurality of multi-media terminals, per a cell, frame or packet, according to a cross connecting method, which the switch 11 employs, for example, a cell-relaying (ATM), a frame-relaying, or a packet-switching system.

In the conventional teleconference system, it was general that only multi-media terminals having the same specification were connected to communicate each other. Further, the conventional terminals for multi-media teleconference were very expensive, so that it is difficult to employ a large number of terminals. Consequently, it was possible to have a group communication, i.e., a multi-media teleconference, only between limited terminals.

SUMMARY OF THE INVENTION

Accordingly, it is an object of the present invention to provide a multi-media teleconference system, which can make the existing telephone terminals join in a multi-media teleconference, and it also becomes possible to serve a group communication with cheap terminals to participants of the teleconference, who need only sound data.

To overcome the above-described drawbacks, a multi-media teleconference system according to the present invention, includes a first multi-media terminal for generating a various kinds of media data including at least, sound data, a plurality of second multi-media terminals for setting connections corresponding to each of the various kinds of media data, a telephone terminal for receiving only sound data, and a switch for receiving the various kinds of media-data sent from the first multi-media terminal and distinguishing a connection for the sound data and extracting only the sound data transferring on the distinguished connection to send the extracted sound data to the telephone terminal.

Further, other objects of the present invention become clearly by the description for explaining embodiments according to the attached drawings.

DESCRIPTION OF THE PREFERRED EMBODIMENTS

Figure 1:
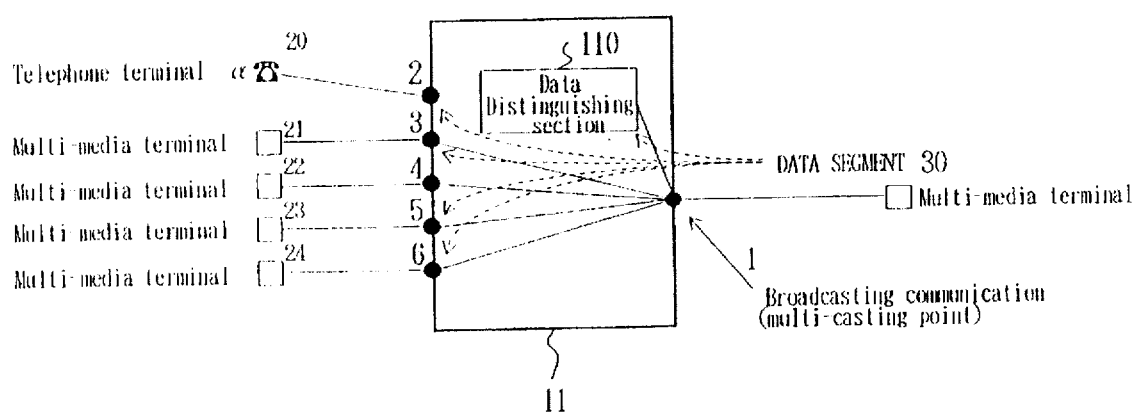
FIG. 1 shows a principle of the present invention.

Embodiments of the present invention will be described in accompanied with drawings as follows. Throughout the following drawings, the same reference numerals are used to denote and identify corresponding or identical components. FIG. 1 shows a principle of the present invention.

In FIG. 1, a reference numeral 20 is an existing telephone terminal, 21 to 24 are multi-media terminals, and further, 30 is a multi-media terminal, which is an information source in FIG. 1.

A switch 11 is linked equivalently to the multi-media terminals and the existing telephone terminals.

The switch 11 includes a broadcasting communication or multi-casting point 1, which is linked to the multi-media terminal 30, a point 2, which is connected to the existing telephone terminal 20, and broadcast communication points 3, 4, 5 and 6, which are linked to each of the multi-media terminals 21 to 24, respectively.

A switch 11 having a data distinguishing section 110 sends data to the points 3, 4, 5, and 6, each of which is linked to the multi-media terminals 21 to 24, respectively. The data distinguishing section 110 acknowledges connection for sound data. The section 110 further extracts only the sound data on the connection and sends the data to a channel oriented toward a telephone terminal 20 via the connection point 2.

The sound data distinguishing section 110 includes a firmware, which distinguishes the sound data. It therefore becomes possible to make the existing telephone terminal 20 join in the multi-media teleconference via the switch 11, as the same as the other multi-media terminals 21 to 24.

Figure 2:
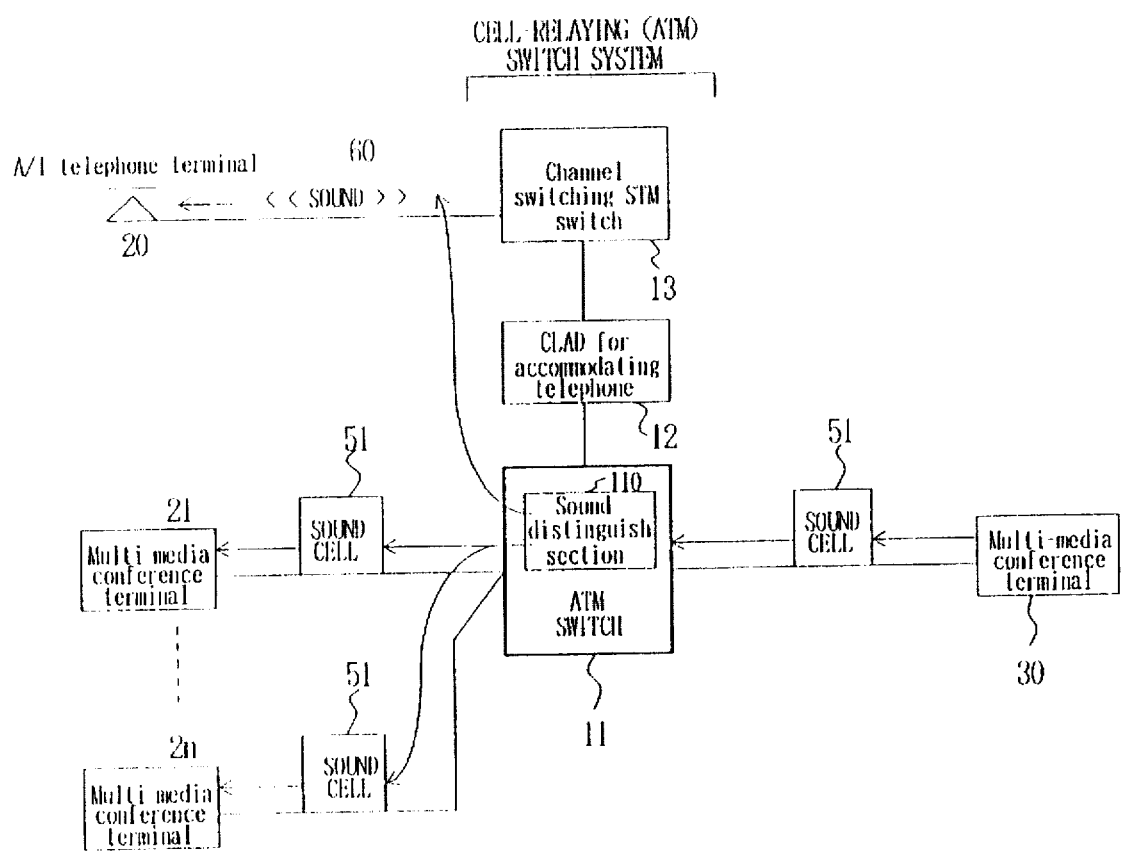
FIG. 2 is a block diagram illustrating an embodiment by the use of a cell-relaying (ATM) switch.

A structure shown in FIG. 2 corresponds to the basic structure shown in FIG. 1. Referring now to FIG. 2, an embodiment employing a cell-relaying (ATM) switch system is illustrated. In FIG. 2, the cell-relaying (ATM) switch system 10 comprises an ATM switch 11, a CLAD device 12, which assembles and disassembles cells for accommodating telephones, and a channel switching STM switch 13.

In this embodiment, the data sent from the terminal 30 are divided into cells, and sent to the ATM switch 11. Each of the cells is branched per a destination and switched in the ATM switch 11. The multi-media terminal 30 outputs multi-media data that have been made cells including the sound cell 51 and inputs them to the ATM switch 11.

The ATM switch 11 sends out the cells to channels corresponding to each of the multi-media conference terminals 21 to 2n, based on an address information of the cell header.

Therefore, as shown in FIG. 2, multi-media data cells including the sound cell 51 are received from the multi-media terminal 30 and are sent to the corresponding multi-media teleconference terminals 21 to 2n, via an ATM switch 11.

The sound distinguishing section 110 in the ATM switch 11 extracts only the sound cell 51, and sends the cell to the CLAD device 12 for accommodating telephones. Then, the cell 51 is led to the channel switching STM switch 13 via the CLAD device 12.

In the structure shown in FIG. 2, the CLAD device 12 is equivalently connected to the ATM switch 11 to the other multi-media terminals. The CLAD device 12 is connected to the channel switching STM switch 13, equivalently to the existing telephone terminals.

Accordingly, the channel switching STM switch 13 receives the existing telephone terminals. The sound data 60 corresponding to the sound cell, which is extracted in the sound distinguishing section 110, and outputted from the CLAD device 12 is sent to the existing telephone terminal 20.

Figure 3:
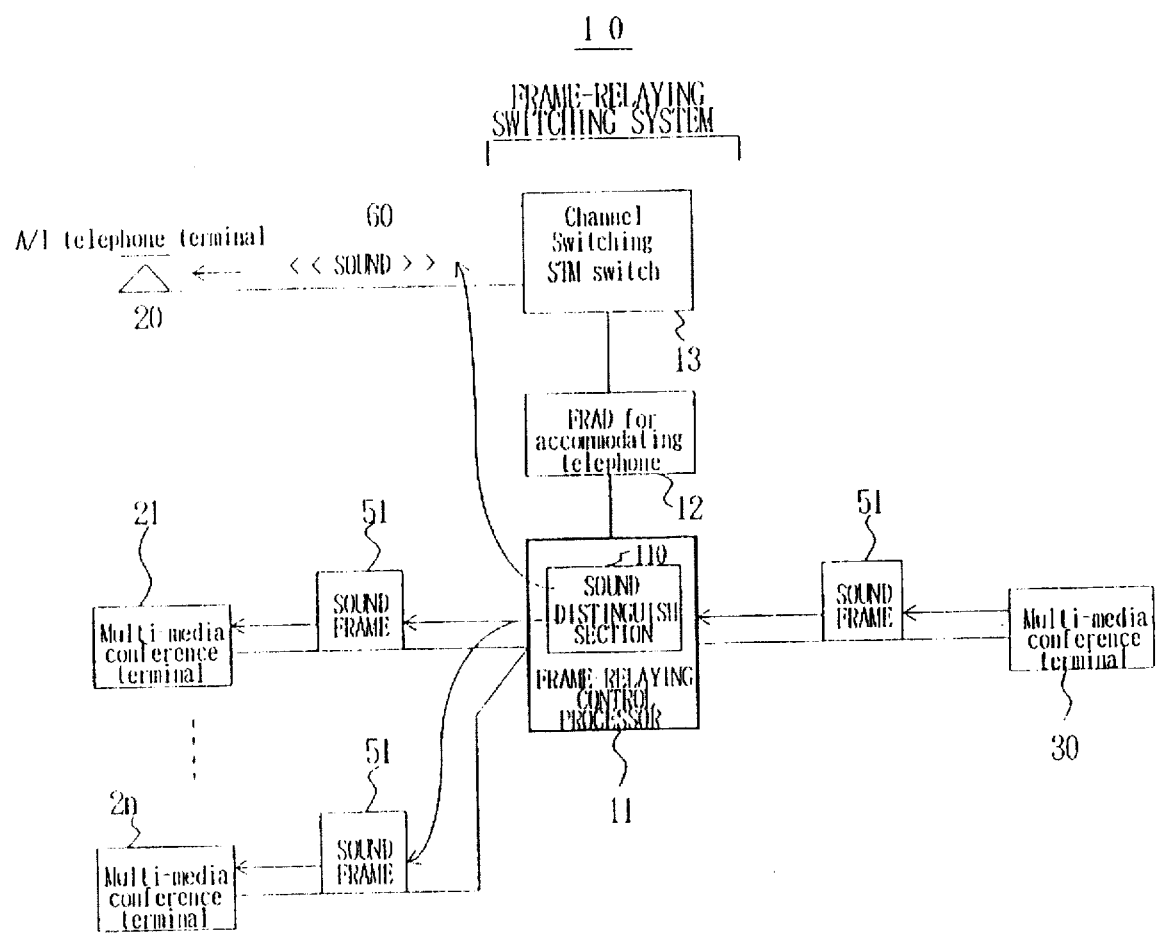
FIG. 3 is a block diagram illustrating an embodiment by the use of a frame-relaying switch.

FIG. 3 shows an embodiment when employing a frame-relaying switch system, corresponding to the basic structure shown in FIG. 1. In this embodiment, data are branched to each frame per a destination, and the frame-relaying control processor 11 switches the data. The multi-media terminal 30 makes the multi-media data into frames including sound frame 51 and inputs the data to the frame-relaying control processor 11. The frame-relaying control processor 11 exchanges the frames, which correspond to each of the multi-media conference terminals 21 to 2n, based on the address data of the frame header, and sends them to the channels.

As the same as shown in FIG. 2, the multi-media data frames including the sound frame 51, which are received from the multi-media conference terminal 30, are sent to the corresponding multi-media conference terminals 21 to 2n via the frame-relaying control processor 11.

Meanwhile, the sound distinguishing section 110 in the frame-relaying control processor 11 extracts only the sound frame 51, and sends it to the frame assembly/disassembly FRAD device 12, which assembles and disassembles frames for accommodating telephones. Further, the frame 51 is led to the channel switching STM switch 13 via the FRAD device 12.

In the structure shown in FIG. 3, the FRAD device 12 is connected to the frame-relaying control processor 11, equivalently to the other multi-media terminals. The FRAD device 12 is connected to the channel switching STM switch 13, equivalently to the existing telephone terminals.

Accordingly, the channel switching STM switch 13 is connected to the existing telephone terminals. The sound data 60 corresponding to the sound frame, which is extracted in the sound distinguishing section 110, and outputted from the FRAD device 12, is sent to the existing telephone terminal 20.

Figure 4:
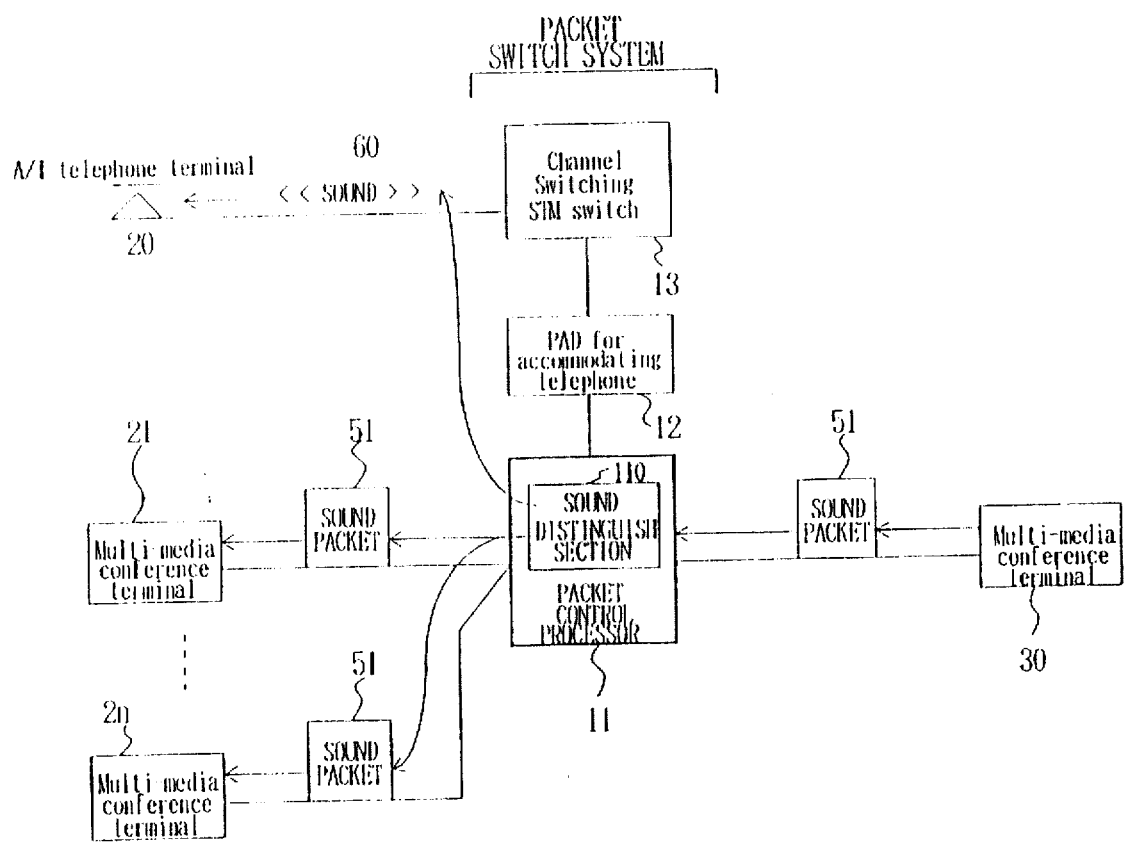
FIG. 4 is a block diagram illustrating an embodiment by the use of a packet switch.

FIG. 4 shows one embodiment when employing a packet switch system, which is corresponding to the basic structure shown in FIG. 1. In FIG. 4, the packet switch system 10 comprises a packet control processor 11, a PAD device 12, which assembles and disassembles packets for accommodating telephones, and a channel switching STM switch 13.

In this embodiment, the data are divided into packets, and sent to the packet-relaying control processor 11. Each of the packets is branched per a destination. The multi-media conference terminal 30 makes the multi-media data into packets including the sound packet 51 and inputs the data to the packet control processor 11.

The packet control processor 11 exchanges the packets, which correspond to the multi-media conference terminals 21 to 2n, respectively, based on the address data of the packet header, and sends the packets to the channels corresponding to the address data.

Therefore, as shown in FIG. 4, the multi-media data cells including the sound packet 51, are sent from the multi-media teleconference terminal 30, to the corresponding multi-media teleconference terminals 21 to 2n via the packet control processor 11.

Meanwhile, the sound distinguishing section 110 in the packet control processor 11 extracts only the sound packet 51 and sends it to the PAD device 12 for accommodating telephones. Then, the packet 51 is led to the channel switching STM switch 13 via the PAD device 12.

In the structure shown in FIG. 4, the PAD device 12 is equivalently connected to the packet control processor 11 to the other multi-media terminals. Then, the PAD device 12 is connected to the channel switching STM switch 13, equivalently to the existing telephone terminals.

Accordingly, the existing telephone terminals are connected to the channel switching STM switch 13. The sound data 60 corresponding to the sound packet, which is extracted in the sound distinguishing section 110, and outputted from the PAD device 12, is sent to the existing telephone terminal 20.

Distinguishing cells, frames or packets of the sound data in the sound distinguishing section 110 will be explained as follows.

Figure 5:
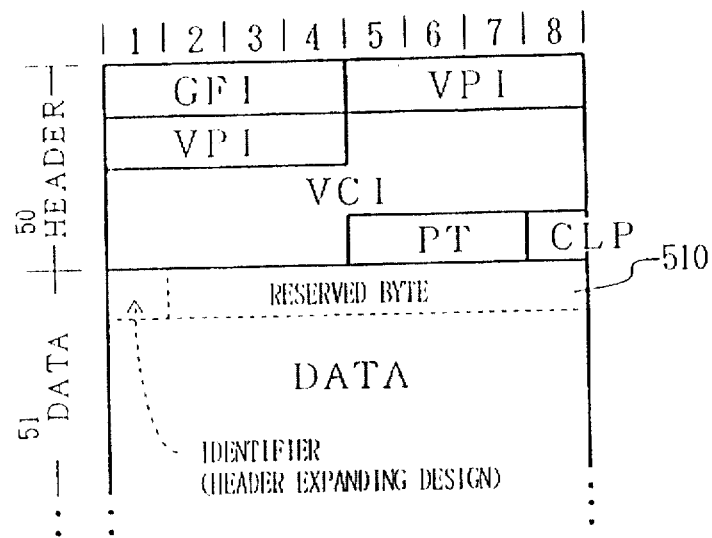
FIG. 5 is a diagram for explaining how to distinguish sound cells in the cell-relaying switch.

FIG. 5 shows a format of a cell, which follows the International Recommendation, when employing a cell-relaying (ATM) switch. The format includes a header section 50 and a data section 51. The header section 50 includes a General Format Identifier (GFI), a Vertical Path Identifier (VPI), a Vertical Channel Identifier (VCI), a Payload Type (PT) and a Cell Loss Priority (CLP).

Each of the media is allocated per a virtual channel connection, which is distinguished according to the VPI or VCI. Therefore, the sound distinguishing section 110 of the ATM switch 11 can distinguish the connection for the sound data according to the VPI or VCI, extract the sound data cell, which is transferred in the distinguished connection, and transmit it to the cell assembly/disassembly device (CLAD) 12 for accommodating telephones.

It is also possible to extract the sound data transferring cell, which is transferred as an identifier by the use of one bit in the payload type (PT). Further, it is possible to increase one byte in the existing header section 50, as a head byte of the data section 51 is used as a reserve byte 510. It is possible to use one bit of the reserve byte 510 as an identifier, which shows that it is the sound data transferring cell.

Further, there are some network services, which do not support the cell loss priority (CLP) in the header sections 50. Accordingly, in this case, it is possible to define the identifier showing that it is the sound data transferring cell by the use of a field defined as a cell loss priority (CLP). A firmware in the sound data distinguishing section 110 acknowledges or distinguishes the identifier, thereby the sound data can be extracted.

It is defined that the sound data are preferentially discarded on network-congestion and the other text or image data takes preference to the sound data, as a multi-media communication rule among terminals. In this case, a cell, which makes the above-described cell loss priority (CLP) ON (b 1), becomes a sound cell.

Accordingly, the sound distinguishing section 110 can distinguish that a cell, which is transferred by recognizing CLP=1 under the control of the firmware, is the transferred sound data cell.

Further, as described above, as it is generally possible to understand the meaning or context of the sound data, even if data is lost somewhat, the setting that the sound data can be preferentially discarded on network congestion and the other text or video image data takes preference to the sound data, can be admitted.

Figure 6:
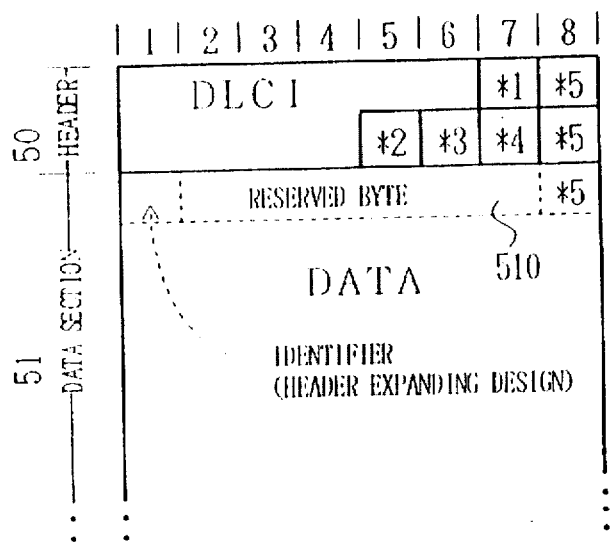
FIG. 6 is a diagram for explaining how to distinguish sound frames in the frame-relaying switch.

FIG. 6 shows a frame format, which follows the International Recommendation, when employing the frame-relaying (FR) switch. The format includes a header section 50 and a data section 51. The header section 50 includes a Data Link Connection Identifier (DLCI), Command/Response C/R (*1), a Forward Explicit Congestion Notification (FECN) (*2), a Backward Explicit Congestion Notification (BECN) (*3), a Discard Eligibility identifier (DE) (*4), and a Header expansion identifier (*5) [0 means a general byte/1 means a extended byte].

Each of the media is allocated per a vertical data link connection, which is distinguished by DLCI. Accordingly, the sound distinguishing section 110 in the frame-relaying control processor 11 can distinguish the connection corresponding to the sound by the means of DLCI, and extract the sound data transferring frame, which is transferred in the identified connection. The section 110 further transfer the extracted frame to the frame assembly/disassembly device (FRAD) 12 for accommodating telephones.

It is also possible to increase one byte to the existing header section 50, namely, a head byte in the data section 51 is used as a reserve byte 510, and define one bit of the byte as an identifier, which shows it is the sound data transferring frame. In this case, a header expansion identifier (*5) of the header section 50 becomes 0.

Further, there are some network services, which do not support the discard eligibility indicator DE (*4). Accordingly, in this case, it becomes possible to define an identifier showing it is the sound data transferring frame by the means of the field, which is defined as the discard eligibility indicator DE (*4).

It is defined that the sound data are preferentially discarded on network-congestion and the other text or image data takes preference to the sound data, as a multi-media communication rule among terminals. In this case, a frame, which makes the above-described discard eligibility indicator (DE) ON (1), becomes a sound frame.

Accordingly, the sound distinguishing section 110 can distinguish that the transferred frame, by recognizing DE=1 under the control of the firmware, is the transferred sound data frame.

Further, as described above, the setting that the sound data can be preferentially discarded on network-congestion and the other text or video image data takes preference to the sound data, can be admitted as the same as the example shown in FIG. 5.

Figure 7:
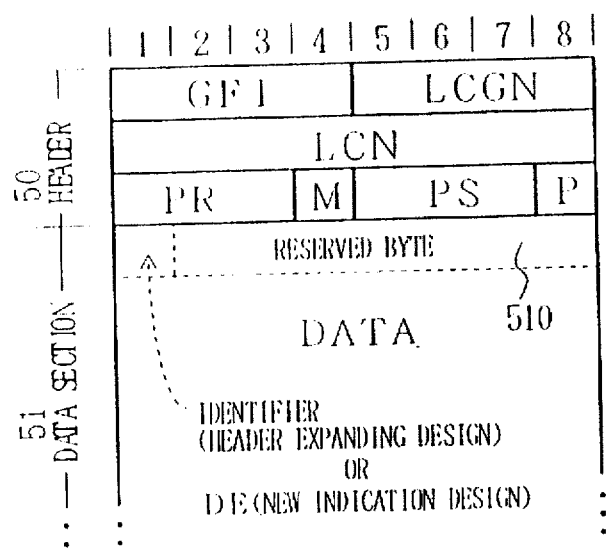
FIG. 7 is a diagram for explaining how to distinguish sound packets in the packet switch.

Referring now to FIG. 7, a packet format, which follows the International Recommendation, when employing the packet switch, is shown. The format includes a header section 50 and a data section 51. The header section 50 includes a General Format Identifier (GFI), a Logical Channel Group Number (LCGN), a Logical Channel Number (LCN), Response Sequence Number (PR), a Expected Sequence Number (PS), a More data bit (M) and a Packet type (P).

Each of the media is allocated per a virtual channel connection, which is distinguished according to the LCGN or LCN. Therefore, the sound distinguishing section 110 of the packet control processor 11 can distinguish the connection corresponding to the sound according to the LCGN or LCN, extract the sound data packet, which is transferred in the distinguished connection, and transmit it to the packet assembly/disassembly device (PAD) 12 for accommodating telephones.

It is also possible to increase one byte to the header section 50, use the byte as a reserve byte 510, and newly set an identifier showing that the user data section 51 is the sound data or define the discard eligibility indicator (DE) as the same as the example shown in FIG. 6. Therefore, it becomes possible to distinguish and extract the transferred sound data packet.

It is defined that the sound data are preferentially discarded on network-congestion and the other text or image data takes preference to the sound data, as a multi-media communication rule among terminals. In this case, a packet, which makes the newly set identifier or the discard eligibility indicator DE ON (1), becomes a sound packet.

Accordingly, the sound distinguishing section 110 can distinguish that a packet, which is transferred, by recognizing the identifier or DE=1 under the control of the firmware, is the transferred sound data cell.

Further, as described above, the setting that the sound data can be preferentially discarded on network-congestion and the other text or video image data takes preference of the sound data, as the same as the example shown in FIG. 5.

An identifying processing of the connection of the sound data in the sound distinguishing section 110 requires to register the data to the switch on call establishment. The setting of registration will be explained as follows.

At first, the setting of registration is performed by indicating a set of multi-media communication connection and a connection number for sound data in a call establishing signal and by sending the call establishing signal. For the multi-media communication connection, VCC is used for the case of a cell relaying switch, DLCI is used for the case of a frame relaying switch and LCN is used for the case of a packet switch.

That is realized by the call establish procedure sent from users according to SVC (Switched Virtual Connection). FIG.

Figure 9:
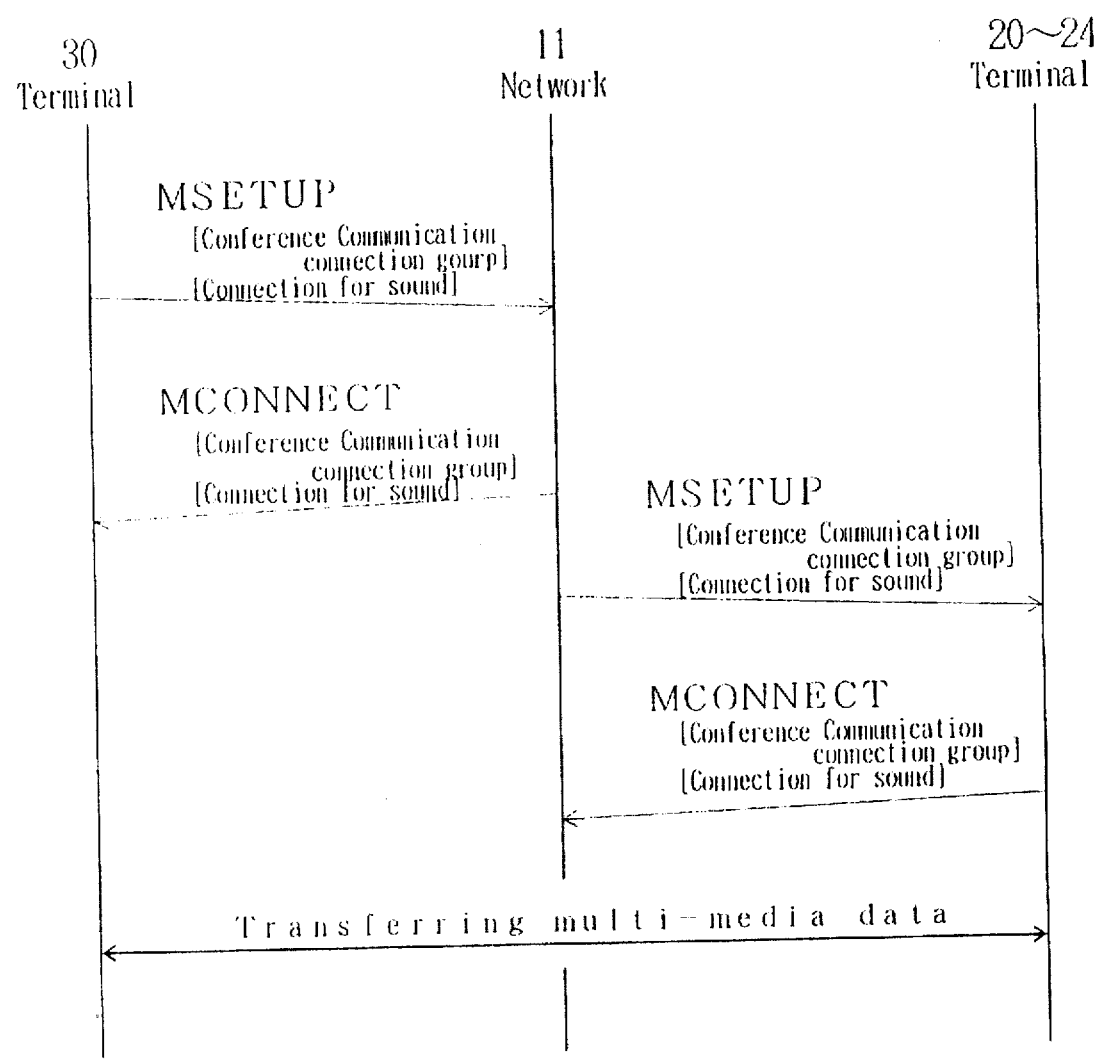
FIG. 9 is a diagram illustrating one example of sequence for negotiation on SVC call-establishment.

8 shows one example of a message format when setting up from terminals to a network (switch) and performing a connection registration sequence. FIG. 9 shows sequences for a set up from terminals to a network (switch) and a connection registration.

Figure 8:
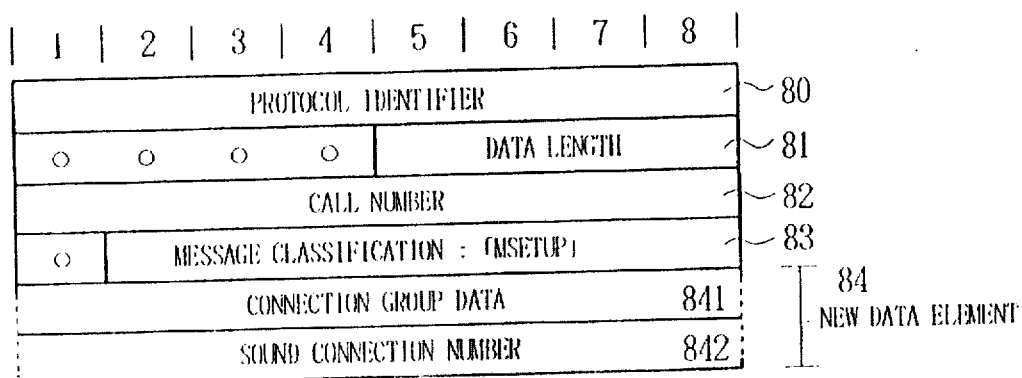
FIG. 8 is a diagram for explaining multi-connection registration.

In FIG. 8, the message format includes a protocol identifier 80, a data length 81, a call number 82, a message classification (MSETUP) 83, and a new data element 84, which is newly added according to the present invention. The new data element 84 further includes a connection group data 841 and a sound connection number 842.

The connection group data 841 is a list of the connection numbers, which are employed for the appropriate multimedia communication. Referring now to FIG. 1, the connection numbers 1 to 6 are corresponding to the connection group data 841. Further, the sound connection number 842 is a connection number for transferring the sound data in the above-described connection group, corresponding to the connection 2 shown in the example of FIG. 1.

A plurality of connections for multi-media conference communication are registered as one set to the network by the use of the above-described message format. FIG. 9 is a flow chart showing the registration of the plurality of connections for multi-media communication.

In FIG. 9, a message MSETUP (refer to 83 of FIG. 8), which is newly defined according to the present invention, is sent to inform the above-described registered data from the multi-media terminal 30 to the switch 11. Then, as explained in FIG. 8, a plurality of connections for multi-media conference communication are registered as one set to the network. Further, according to the present invention, a connection for sound data communication in the plurality of connections are specified to register to the network (switch) 11.

A master connect signal MCONNECT, which is an acknowledge signal, for registering a plurality of connections defined according to the present invention as a path of one set, is replied from the network 11.

Further, negotiation of sending and replying the registration signal MSETUP and an acknowledge signal MCONNECT is performed between other multi-media terminals in one set of the plurality of connections for multi-media conference communication. Then, the registration of the plurality of connections is completed.

After that, multi-media data are transferred via the switch 11 between the multi-media terminals corresponding to the registered plurality of connections and the existing telephone terminals, which are discussed in FIGS. 1 to 4.

Figure 10:
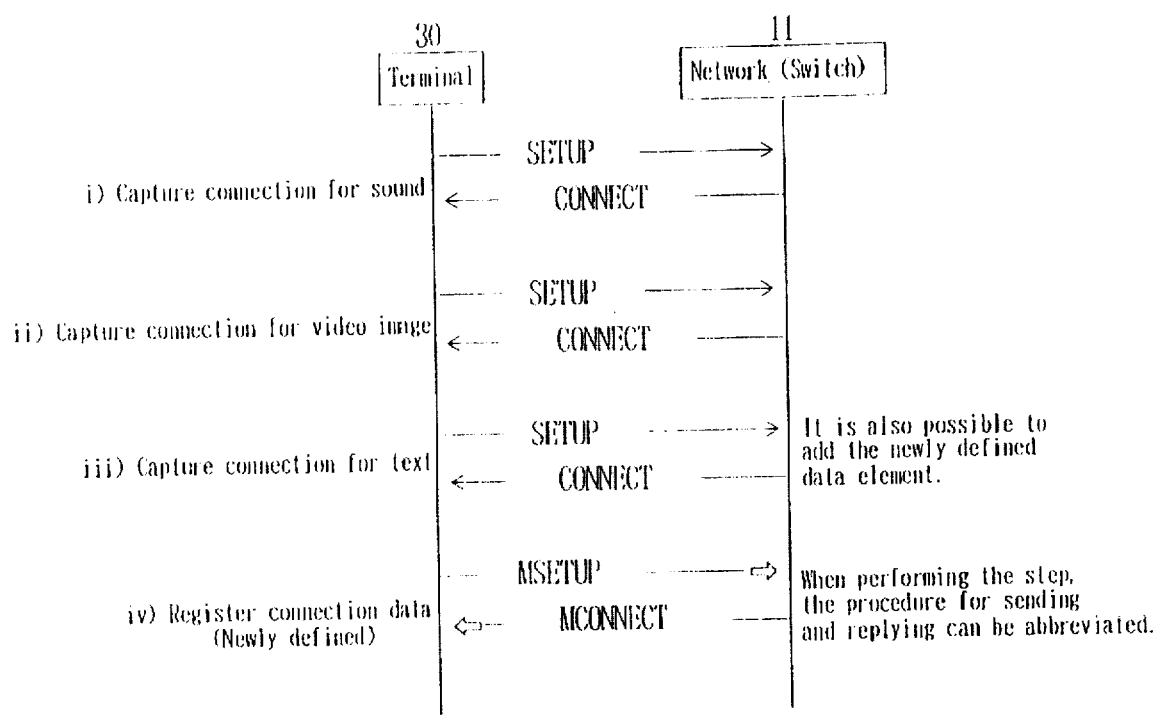
FIG. 10 is an explanatory diagram in accompanied with FIG. 9.
Figure 11:
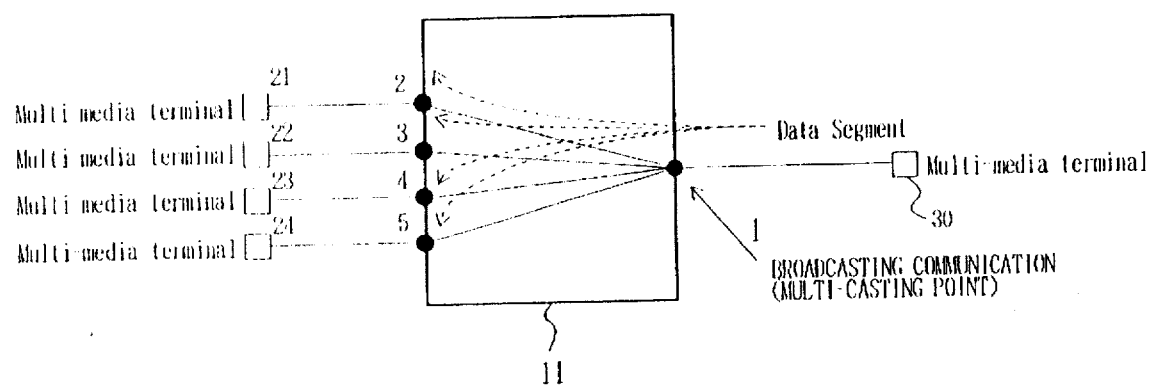
FIG. 11 is an explanatory diagram for the conventional broadcasting data communication for multi-connection.

FIG. 10 shows a procedure of registering the plurality of connections for the above-described multi-media conference communication in relation to normal call establishment shown in FIG. 9. That is, in FIG. 10, i) to iii) show the cases of setting the connections for sound, video image and text, respectively. The terminal 30 sends the registration messages SETUP to the network 11. Then, the network 11 replies the acknowledge signals CONNECT for each of the cases i) through iii).

iv) of FIG. 10 shows the case where the plurality of connections for multi-media conference communication are set as one set, as explained in FIG. 9. Further, when capturing the connection for text iii), if the message, which is newly defined according to the present invention, is added and sent to the network 11, it becomes possible to omit the procedure of iv) for sending message and replying an acknowledge went signal for negotiation.

As explained according to the embodiments of the present invention, when performing multi-media communication, the existing telephone terminals are included in a connection group and registered to the network as the same as the other multi-media terminals. Further, a function for extracting cells, frames, or packets is added to the switch. Thereby, it becomes possible to make the existing telephone terminals join in the multi-media conference system by sending the extracted sound data to a channel for the existing telephone terminal.

The invention maybe embodied in other specific forms without departing from the spirit or essential characteristics thereof. The present embodiments are therefore to be considered in all respects as illustrative and not restrictive, the scope of the invention being indicated by the appended claims rather than by the foregoing description and all changes that come within the meaning and range of equivalency of the claims are therefore intended to be embraced therein.

What is claimed is:

1. A multimedia teleconference system for exchanging multimedia data between multimedia terminals, comprising:

multimedia terminals registered as a group for teleconferencing, including, a first multimedia terminal generating multimedia data including sound data and for further forming the multimedia data in segments each having connection data and an indicator for indicating whether or not the sound data is present, second multimedia terminals receiving the multimedia data;

telephone terminals registered as the group for teleconferencing, receiving only sound data; and a switch receiving the multimedia data generated and sent from the first multimedia terminal, detecting the connection data, extracting the sound data from the multimedia data according to the indicator, and sending the multimedia data to the multimedia terminals according to the connection data, the switch also sending sound data only to the telephone terminals.

2. The multimedia teleconference system according to claim 1, wherein each of the segments is formed in a cell format having a header including a virtual channel identifier, and the switch is a cell-relaying switch for distinguishing the connection data from the sound data according to the virtual channel identifier of the cell format for cell-relaying.

3. The multimedia teleconference system according to claim 2, wherein each of the segments include a cell header section and a user data section, and the cell header section has the indicator showing that the sound data is present in the user data section, and the cell-relaying switch extracts a segment including the sound data according to the indicator and sends the sound data to the telephone terminal.

4. The multimedia teleconference system according to claim 3, wherein the indicator is a flag bit of cell loss priority defined in the cell header section, indicating a cell which includes the sound data.

5. The multimedia teleconference system according to claim 2, wherein the connection data includes a virtual channel connection for the multimedia data and a virtual connection number for the sound data, and is set on call establishment.

6. The multimedia teleconference system according to claim 1, wherein each of the segments is formed in a frame format having a header including an address data, and the switch is a frame-relaying switch for distinguishing the connection data from the sound data according to the address data of the frame format for frame-relaying.

7. The multimedia teleconference system according to claim 6, wherein each of the segments include a frame header section and a user data section, and the frame header section has the indicator showing that the sound data is present in the user data section, and the frame-relaying switch extracts a segment including the sound data according to the indication and sends the sound data to the telephone terminal.

8. The multimedia teleconference system according to claim 7, wherein the indicator is a flag bit of discard eligibility defined in the frame header section, indicating a frame which includes the sound data.

9. The multimedia teleconference system according to claim 6, wherein the connection data includes a data link connection identifier for the multimedia data and a data link connection number for the sound data, which is set on call establishment.

10. The multimedia teleconference system according to claim 1, wherein each of the segments is formed in a packet format having a header including a logical channel group number identifier and a logical channel number, and the switch is a packet switch for distinguishing the connection data from the sound data according to the logical channel group number identifier or the packet format.

11. The multimedia teleconference system according to claim 10, wherein each of the segments include a packet header section and a user data section, and the packet header section has the indicator showing that the sound data is present in the user data section, and the packet switch extracts a segment including the sound data according to the indication and sends the sound data to the telephone terminal.

12. The multimedia teleconference system according to claim 11, wherein the indicator is a flag bit of loss priority defined in the packet header section, indicating a cell which includes the sound data.

13. The multimedia teleconference system according to claim 10, wherein the connection data includes a first logical channel number for the multimedia data and a second logical channel number for the sound data, and is set on call establishment.

14. The multimedia teleconference system according to claim 1, further comprising:

means operatively connected to the switch for disassembling the segments to extract the sound data; and channel switching means provided between the disassembling means and the telephone terminals for connecting the extracted sound data to the telephone terminals.

15. The multimedia teleconference system according to claim 1, wherein each of the segments include a protocol header section and a user data section, and the protocol header section has the indicator showing that the sound data is present in the user data section, and the switch extracts a segment including the sound data according to the indication and sends the sound data to the telephone terminal.

* * * * *